United States Patent
Weller et al.

(10) Patent No.: US 7,691,224 B2
(45) Date of Patent: Apr. 6, 2010

(54) THERMAL BONDING METHOD

(76) Inventors: Kip D. Weller, 5-N., 254 Blue Heron Ct., Saint Charles, IL (US) 60175; Michael J. Badera, 26 Sunset Dr., Queensbury, NY (US) 12804

( * ) Notice: Subject to any disclaimer, the term of this patent is extended or adjusted under 35 U.S.C. 154(b) by 799 days.

(21) Appl. No.: 11/586,249

(22) Filed: Oct. 25, 2006

(65) Prior Publication Data
US 2007/0095474 A1 May 3, 2007

Related U.S. Application Data

(60) Provisional application No. 60/731,403, filed on Oct. 28, 2005.

(51) Int. Cl.
*B32B 37/00* (2006.01)
*B29C 65/00* (2006.01)

(52) U.S. Cl. .............. 156/308.2; 156/309.6; 427/208.2

(58) Field of Classification Search .............. 427/207.1, 427/208.2; 156/308.2, 308.6, 309.6, 324.4
See application file for complete search history.

(56) References Cited

U.S. PATENT DOCUMENTS

| | | | |
|---|---|---|---|
| 3,628,982 A * | 12/1971 | Krug | ............... 427/208.2 |
| 3,634,924 A | 1/1972 | Blake et al. | |
| 3,901,965 A | 8/1975 | Honeyman, III | |
| 4,003,382 A | 1/1977 | Dyke | |
| 4,055,187 A | 10/1977 | Patel et al. | |
| 4,251,305 A | 2/1981 | Becker et al. | |
| 4,262,820 A * | 4/1981 | Flint | ............... 222/146.2 |
| 4,301,803 A | 11/1981 | Handa et al. | |
| 4,323,071 A | 4/1982 | Simpson et al. | |
| 4,342,316 A | 8/1982 | Rosenberg | |
| 4,406,653 A | 9/1983 | Nimez | |
| 4,661,095 A | 4/1987 | Taller et al. | |
| 4,702,252 A | 10/1987 | Brooks et al. | |
| 4,737,219 A | 4/1988 | Taller et al. | |
| 4,888,082 A * | 12/1989 | Fetcenko et al. | ............ 156/500 |
| 4,913,701 A | 4/1990 | Tower | |
| 4,935,190 A | 6/1990 | Tennerstedt | |
| 5,160,559 A | 11/1992 | Scovil | |
| 5,195,969 A | 3/1993 | Wang et al. | |
| 5,240,537 A | 8/1993 | Bodicky | |
| 5,395,336 A | 3/1995 | Barclay | |
| 5,425,712 A | 6/1995 | Goodin | |
| 5,522,961 A | 6/1996 | Leonhardt | |

(Continued)

*Primary Examiner*—John L Goff
(74) *Attorney, Agent, or Firm*—Meroni & Meroni, P.C.; Charles F. Meroni, Jr.; Christopher J. Scott

(57) ABSTRACT

A thermal polymer-bonding method includes initially placing into contact certain polymer-based first and second solid media at a first junction. A first superficial portion of the first solid medium is liquefying through the application of thermal energy to the first junction. The liquefied first superficial portion is superficially or topically applied to the second solid medium whereafter the topical application may be solidified via the action of cooling or withdrawal of thermal energy from the first junction. The solidification of the liquid elements, having maximized surface area contact between opposing media, bonds the first solid medium to the second solid medium. A third polymer-based solid medium may then be placed into contact with the first solid medium at a second junction, whereafter certain select second superficial portions of the first and third solid media may be liquefied, and re-solidified to bond the third solid medium to the first solid medium.

30 Claims, 11 Drawing Sheets

U.S. PATENT DOCUMENTS

| | | |
|---|---|---|
| 5,769,830 A | 6/1998 | Parker |
| 5,797,877 A | 8/1998 | Hamilton et al. |
| 5,985,435 A * | 11/1999 | Czaplicki et al. ............ 428/323 |
| 6,086,556 A | 7/2000 | Hamilton et al. |
| 6,132,824 A | 10/2000 | Hamlin |
| 6,136,258 A | 10/2000 | Wang et al. |
| 6,482,348 B1 | 11/2002 | Wang et al. |
| 6,712,832 B2 | 3/2004 | Shah |
| 6,827,798 B1 | 12/2004 | Ichikawa et al. |
| 6,896,842 B1 | 5/2005 | Hamilton et al. |
| 2001/0004703 A1 | 6/2001 | Tiernan |
| 2002/0010420 A1 | 1/2002 | Bagaoisan et al. |
| 2002/0110657 A1 | 8/2002 | Wang et al. |
| 2002/0171180 A1 | 11/2002 | Simhambhatla |
| 2003/0014070 A1 | 1/2003 | Meens |
| 2003/0014100 A1 | 1/2003 | Meens et al. |
| 2003/0211258 A1 | 11/2003 | Sridaran et al. |
| 2003/0226631 A1 | 12/2003 | Sterud et al. |
| 2004/0020586 A1 | 2/2004 | Blankenship et al. |
| 2004/0061261 A1 | 4/2004 | Gonzalez |
| 2004/0062890 A1 | 4/2004 | Wang et al. |
| 2004/0068287 A1 | 4/2004 | Lim et al. |
| 2004/0176791 A1 | 9/2004 | Lim et al. |
| 2004/0232589 A1 | 11/2004 | Kawabata et al. |
| 2004/0256049 A1 | 12/2004 | O'Shaughnessy et al. |
| 2005/0121824 A1 | 6/2005 | Gonzalez |

* cited by examiner

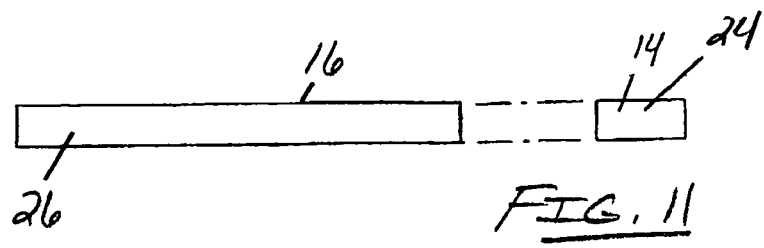
FIG. 11
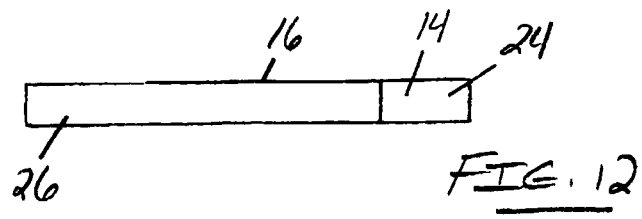
FIG. 12
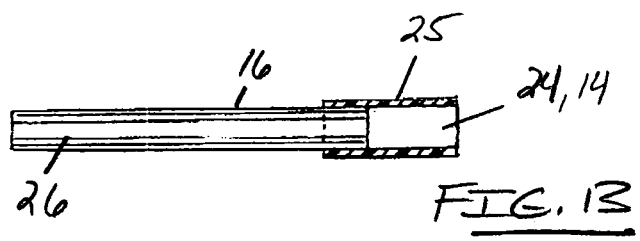
FIG. 13
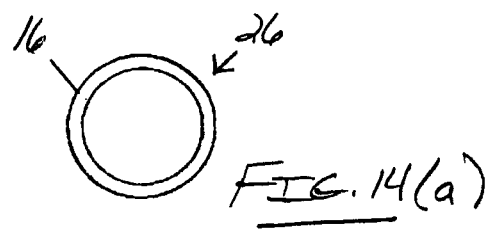
FIG. 14(a)
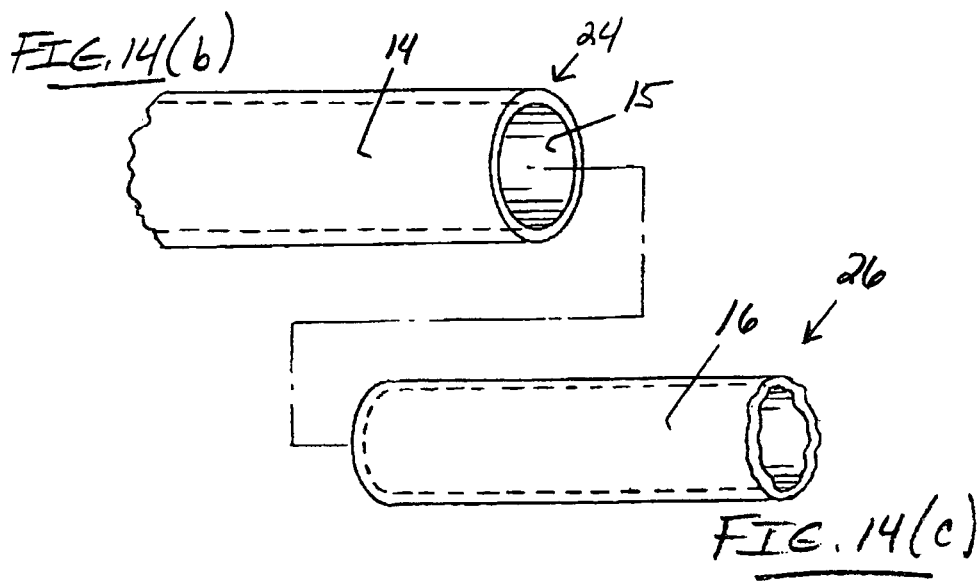
FIG. 14(b)
FIG. 14(c)

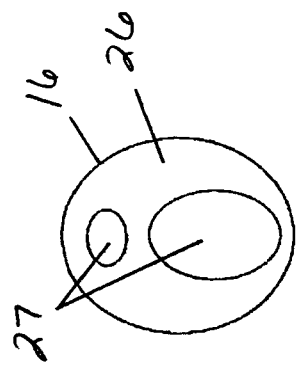
FIG. 19
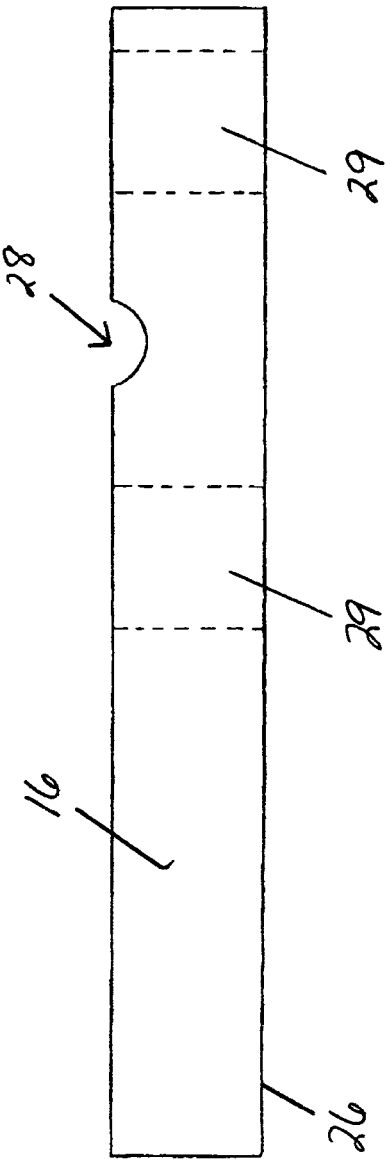
FIG. 20
FIG. 21

THERMAL BONDING METHOD

PRIOR HISTORY

This non-provisional application claims the benefit of U.S. Provisional Patent Application No. 60/731,403, filed in the United States Patent and Trademark Office on Oct. 28, 2005.

BACKGROUND OF THE INVENTION

1. Field of the Invention

The disclosed invention generally relates to a thermal bonding method. More particularly, the disclosed invention relates to a thermal bonding method usable to effectively bond plastic tubular structures to one another such as, for example, balloon type structures to catheters.

2. Description of the Prior Art

Medical balloon structures are typically assembled in combination with basal tubular structures such that the balloon is the outer component. The balloon is typically thin and thermal energy needs to be applied from the outside inward. To thermally bond a balloon to a basal tubular structure, thermal energy must first transfer through the balloon in the neck area. To join two materials, especially if they are not the very same material of the same compound and hardness, both materials must be brought close to their melt point or to their softening point so that the materials will fuse together or "mix" together at the skin level. Just melting the "top" material and making contact with the material underneath often will not provide the secure bond and complete fusion required. Since the outer component is heated first it actually has to get hotter than is needed at the joining area, which is the inside wall of the outer component and the outer wall of the inside component. The inner component or tube immediately acts as a heat sink absorbing heat and taking it away from the joint area. The shaft is often of a higher hardness than the balloon and can have a higher melt point. This means that the outer material may need to be heated beyond its own melting point to obtain a proper bond.

In structural situations characterized by a shaft or basal tubular structure and balloon comprising two different materials, which can also be of different hardnesses, the melt points can be much different. Normally it is assumed the shaft will have the higher melt point, which increases the difficulty of thermal bonding. When the balloon would have the higher melting point then the problem still exists but in reverse. To get the balloon neck surface to its melting point can deform, degrade or destroy the shaft at the joining area. In some cases the two materials being used have been found to be non bondable by existing thermal means. In other words even when softened by heat or slightly melted the two materials do not mix well and will not join, one to the other. Balloon, or shaft, materials, such as PET, that are semi-crystalline and do not soften when heated and can not be thermally bonded using traditional methods.

SUMMARY OF THE INVENTION

In an attempt to address the foregoing shortcomings readily apparent in the art, the disclosed methodology essentially comprises a pre-bonding step during which one or both of the surfaces to be joined are pre-bonded in the area to be joined. The pre bonding "layer" can be the same material that the lower temp component is made of. In this instance the lower temp component is then being joined "to itself" or to identical material which lowers the temperature needed at that time. The pre bonding can be of the same material as the lower temperature component but a different durometer (softness/hardness), normally a lower durometer. If this lower durometer joining layer has a slightly lower melt point than the other two components, or the minimum of those two, then joining can be done without damage due to heat. Both surfaces can be pre bonded with the same joining layer if/when needed or beneficial.

The heat can be applied by various means, hot air, metal or other heated tooling, split tie, radio frequency heating, laser heating, and other means. Heat shrink tubing can be incorporated, with hot air and with mechanical dies. Mechanical means can be used to provide pressure. Heat shrink, either alone or with additional pressure, can provide a smooth surface once removed. The use of heat shrink tubing, or other methods that can limit or eliminate the exposure to air and oxygen during heating can allow the joining material, especially when it has a lower melt point than the material it is first being fused to, to be heated beyond its melt point without degradation, in some cases well beyond its own melt point. The material, being held in place and under some pressure, by way of heat shrink tubing or tooling, stays uniform and has a consistent wall. By being "superheated" in this way it can be brought to the melt temperature of a higher temperature material and in doing so can "deeply fuse" or bond with that material. This results in a shaft or tubing of one material but in a selected area it has a coating, normally quite thin, of a second material.

It is at the surface of this second material that the joining of the secondary component will be made. A "two layer" process can be used to "captivate" the neck area of a balloon (the two layers being both under and over the neck) wherein the two layers may become bonded to the neck to form a unitary, multilayered structure. An additional compression sleeve can be added as a final step to provide compression sealing when pressures and other parameters dictate the need for compression at the joint area. The "pre bond" component or material is shown in these examples in a tubular form, which it may be in many instances, since this specific application is for bonding of tubular shaped components. A tubular shaped pre bond material, slit or un-slit would fit well and help maintain position.

There may be cases where a strip of flat material may be used instead, due to ability to make the material the thickness desired or other reasons. A strip could be heat tacked in place, held by heat shrink tubing or the tooling used to apply the material or other means. This method can also be used with materials that will not soften or melt when heated, such as semi-crystalline balloons made of PET. These balloons are normally adhesive bonded because "conventional" thermal bonding methods will not work. In this type of application a "pre-bond" sleeve or layer of a material is used that will then soften and stick to both the shaft and the balloon surface. Even though this pre-bond material may not be fusing with the balloon, or shaft, component, it was selected due to its "sticky" or adhesive properties. In this particular instance it is a way of applying a "hot melt plastic" layer between the two components to be heated or activated when needed. Heat and pressure can be used, as needed, to achieve a good strong attachment and seal.

Thus, it is contemplated that the present disclosure essentially provides a certain thermal (polymer-) bonding method for finally bonding a polymer-based component assembly, which methodology initially comprises the step of contacting first and second solid, polymer-based media at a one first junction. The first junction may preferably be cylindrical, but alternatively could be substantially planar. Notably, the first and second solid media have differing thermal properties, including differing melting points. The first solid medium thus has a first melting point and a first medium thickness and the second solid medium has a second melting point, the first melting point being lesser in magnitude than the second melting point.

After placing the first and second solid media into contact with one another, the first junction may be thermally energized or heated to liquefy a first superficial portion of the first solid medium. The liquefied first superficial portion may then be superficially applied to the second solid medium via the contacting first and second solid media. The first solid medium may then be either removed from the junction or retained in place. If retained in place and the liquefied superficial portion at the first junction is thermally de-energizing or cooled, the first solid medium is thereby bonded to the second solid medium. The bonded first and second solid media together form an intermediary component assembly.

Once the intermediary component assembly is formed, the first solid medium may be placed into contact with a third solid medium at a second junction, which third solid medium has a third melting point lesser in magnitude than the second melting point. The second junction is separated from the first junction by the first medium thickness; if the junctions are cylindrical, the second cylindrical junction is radially separated from the first cylindrical junction by the first medium thickness. The second junction may then be thermally energizing or heated to liquefy second superficial portions of the first and/or third solid media. It is contemplated that the liquefied second superficial portions enable relatively rapid material diffusion intermediate the first and third solid media in a material diffusion zone or enhance surface area contact therebetween. The material diffusion zone or liquid portions may be thermally de-energized or cooled thereby solidifying the liquefied second superficial portions and thermally bonding the third solid medium to the first solid medium to form a finally-bonded polymer-based component assembly.

Other objects of the present invention, as well as particular features, elements, and advantages thereof, will be elucidated or become apparent from, the following description and the accompanying drawing figures.

BRIEF DESCRIPTION OF THE DRAWINGS

Other features of our invention will become more evident from a consideration of the following brief description of our patent drawings, as follows:

FIG. 11 is a fragmentary side view depiction of a leftward basal tubing structure as juxtaposed in exploded relation adjacent a rightward pre-bondable sleeve.

FIG. 12 is a fragmentary side view depiction of the basal tubing structure and pre-bondable sleeve shown in FIG. 11 depicting the pre-bondable sleeve outfitted upon the basal tubing structure thus forming a pre-bonded initial bond assembly.

FIG. 13 is a fragmentary side view depiction of the initial bond assembly shown in FIG. 12 outfitted with a first shrink sleeve member positioned in enveloping relation about the basal tubing structure and the pre-bondable sleeve for forming a secondary pre-bonded assembly.

FIG. 14(a) is an end view of the basal tubing structure otherwise depicted in FIG. No. 11.

FIG. 14(b) is a fragmentary perspective end view of the pre-bondable sleeve otherwise depicted in FIG. 11 positioned for receiving the basal tubing structure.

FIG. 14(c) is a fragmentary perspective end view of the basal tubing structure otherwise depicted in FIG. 14(a) positioned for receiving the pre-bondable sleeve further depicted in FIG. 14(b).

FIG. 19 is an end view of a multi-lumen basal tubing structure.

FIG. 20 is a side view depiction of the multi-lumen basal tubing structure shown in FIG. 19 showing an inflation lumen notch.

FIG. 21 is a side view depiction of the multi-lumen basal tubing structure shown in FIG. 20 showing first and second "pre-bond" regions adjacent the inflation lumen notch.

FIG. 42(*b*) is a fragmentary top perspective end view of the top portion of a longitudinally sectioned pre-bondable sleeve bonded to a basal tubing structure.

FIG. 42(*c*) is a fragmentary top perspective end view of the bottom portion of a longitudinally sectioned pre-bondable sleeve bonded to a basal tubing structure.

DETAILED DESCRIPTION OF THE PREFERRED METHOD(S)

Figure 1:
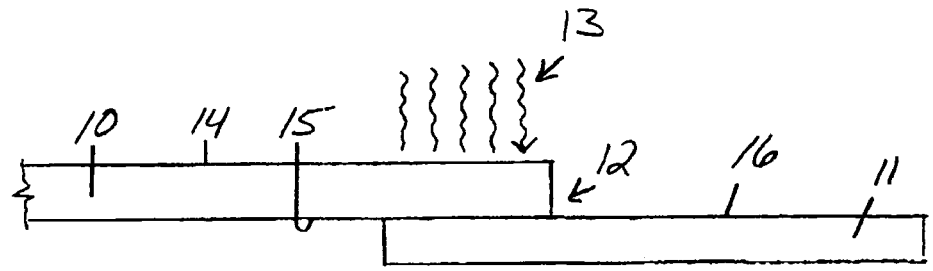
FIG. 1 is a fragmentary side view depiction of an initial "pre-bonding" step of the preferred methodology depicting an outer component layer and an inner component layer as juxtaposed at a component junction with heat energy being transferred into the outer component layer at the component junction.

Referring now to the drawings, the preferred methodology of the present invention concerns a thermal bonding method for bonding polymer or plastic tubular structures to one another, such as, for example, a catheter (comprising a first material or set of materials with a first melting point characteristic) to a (medical) balloon type structure (comprising a second material or set of materials with a second melting point). Generally, first and second component layers may be (thermally) bonded to one another at a bond junction or component junction. In this regard, FIG. 1 depicts a first component 10 being thermally bonded to a second component 11. First component 10 comprises a first bond surface 15 as illustrated and referenced in FIGS. 1, 3, 4, and 14(*b*); and a thermal energy-receiving surface 14 as generally illustrated and referenced in FIGS. 1, 3, 4, 11-13, 14(*b*), 15, 16, 18, 25-33, and 36.

Figure 2:
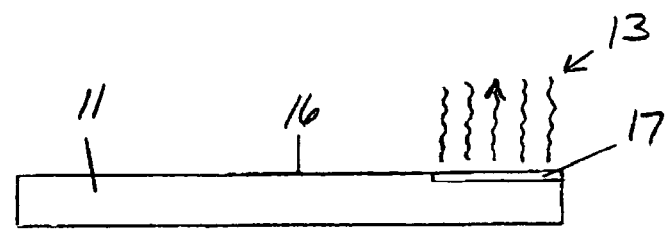
FIG. 2 is a fragmentary side view depiction of the inner component layer shown in FIG. 1 as pre-bonded with a portion of the outer component layer shown in FIG. 1, the portion of the outer component layer having been thermally bonded to the inner component layer to form a pre-bonded portion of the outer component layer.
Figure 3:
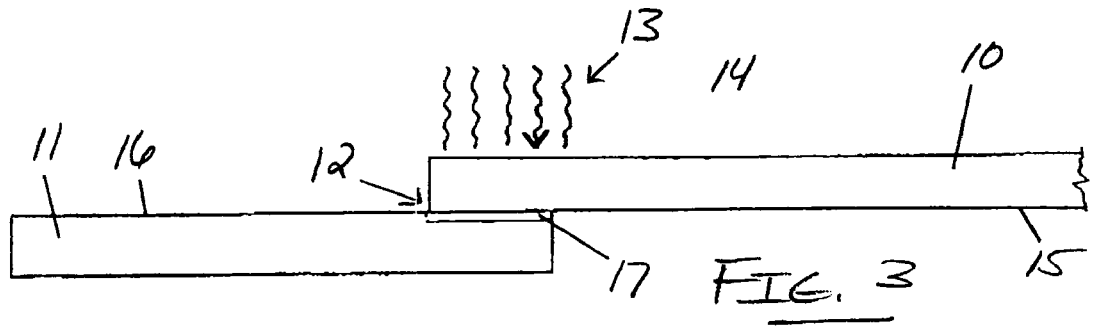
FIG. 3 is a fragmentary side view depiction of a second "final-bonding" step of the preferred methodology depicting the outer component layer and the inner component layer as juxtaposed at the component junction with heat energy again being transferred into the outer component layer at the component junction for finally-bonding the outer component layer to the pre-bonded portion of the outer component layer shown in FIG. 2.
Figure 4:
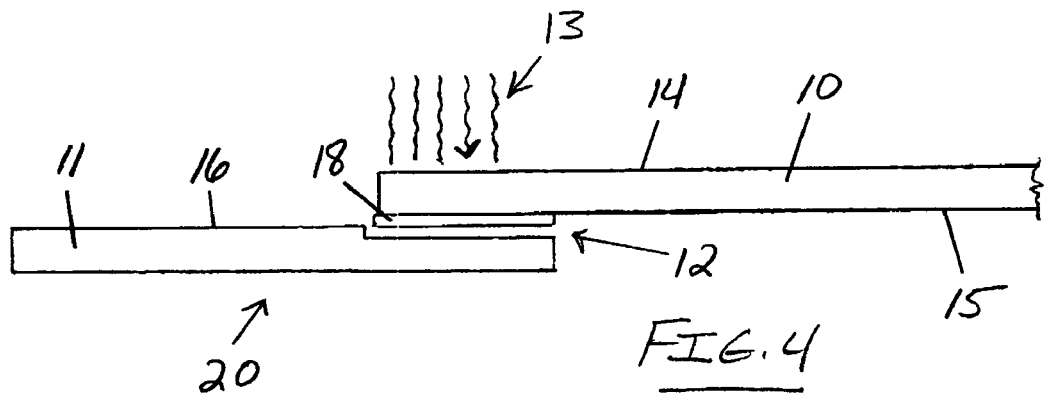
FIG. 4 is a fragmentary side view depiction of a second "final-bonding" step of an alternative methodology depicting an outer component layer and an inner component layer as juxtaposed at a component junction with heat energy being transferred into the outer component layer at the component junction for finally-bonding the outer component layer to a pre-bonded third component layer.
Figure 5:
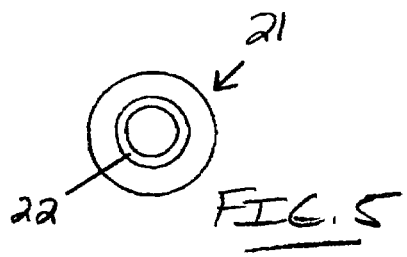
FIG. 5 is a proximal end view depiction of a prior art medical balloon structure.
Figure 6:
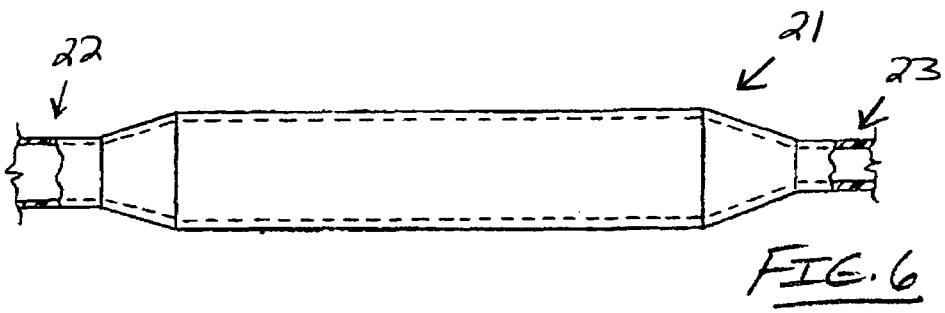
FIG. 6 is a fragmentary side view depiction of a prior art medical balloon structure.

It will be understood from an inspection of FIGS. 1-4 that thermal energy 13, as directed from a heat source, is applied to energy-receiving surface 14 (and is transmitted into the material(s)) as a means to thermally bond first bond surface 15 (by liquidating a portion thereof) to a pre-bond-receiving surface 16 (as illustrated and referenced in FIGS. 1-4, 11-14(*a*), 14(*c*)-21, 25, and 26-36) of second component 11 at a component junction 12 as referenced in FIGS. 1, 3, and 4. The resulting structure is a first preferred intermediary component assembly 19 as generally illustrated and referenced in FIG. 2. It should be noted that heat or thermal energy as referenced at 13 may be regarded as transferring from regions of higher energy content to regions of lower energy content according to classical thermodynamic principles and thus may be regarded as entering and leaving intermediary component assembly 19 depending on whether surrounding environs comprise more or less "heat". When thermal energy transfers out of intermediary component assembly 19 as depicted in FIG. 2, the residue there remaining from component 10 solidifies.

It will thus be seen that after thermal energy application to component 10 and component 11 at junction 12 (and subsequent removal of thermal energy 13 therefrom), a first intermediary layer 17 is formed upon second component 11 as illustrated and referenced in FIGS. 2 and 3, which first intermediary layer 17 serves as a coupling or bonding point for further secondary, final bonding steps or procedures. In this last regard, the reader is directed to further inspect FIG. 3. From an inspection of the noted figure, it will be seen that thermal energy 13 is again applied to energy-receiving surface 14 as a means to thermally bond first bond surface 15 of first component 10 to first intermediary layer 17 in a first preferred method. It perhaps is worth noting that ambient air may be excluded during thermal energy application thus allowing heating of the "pre-bond" material to heat levels beyond normally allowable levels, allowing it to bond with higher temperature substrates as the higher temperature component is brought to its softening point.

A second preferred method or alternative methodology of the present invention concerns a thermal bonding method for bonding a catheter (comprising a first material or set of materials with a first melting point characteristic) to a (medical) balloon type structure (comprising a second material or set of materials with a second melting point) via a third material (or set of materials) with a third melting point. As previously noted, first and second component layers may be (thermally) bonded to one another at a bond junction or component junction. As described hereinabove, the first intermediary layer 17 (comprising the same material(s) as first component 10) functions to bond first component 10 to second component 11. The alternative methodology here contemplated involves use of a third material for creating a second intermediary layer 18 as generally illustrated and referenced in FIG. 4. In this regard, a third component may be pre-bonded to second component 11 in much the same manner as first component 10 was pre-bonded to second component 11 as heretofore described.

A second intermediary layer 18 is thus deposited or thermally bonded upon pre-bond-receiving surface 16. From an inspection of FIG. 4, it will be seen that thermal energy 13 is applied to energy-receiving surface 14 of first component 10 as a means to thermally bond pre-bond-receiving surface 16 of second component 11 to second intermediary layer 18. Notably, the quantity of thermal energy 13 required for pre-bonding first bond surface 15 to second intermediary layer 18 may differ from the quantity of energy for pre-bonding intermediary layer 18 to pre-bond-receiving surface 16.

Figure 27:
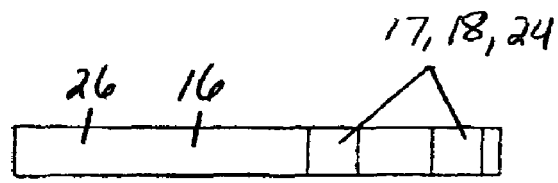
FIG. 27 is a fragmentary side view depiction of the basal tubing structure shown in FIG. 26 as pre-bonded with the first and second pre-bondable sleeves thus forming a double-banded secondary pre-bonded tubing assembly.
Figure 28:
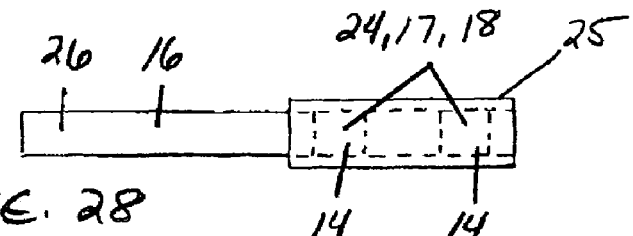
FIG. 28 is a fragmentary side view depiction of the double-banded secondary pre-bonded tubing assembly shown in FIG. 27 as outfitted with a shrink sleeve in enveloped relation about the first and second pre-bondable sleeves.
Figure 29:
FIG. 29 is a fragmentary side view depiction of a leftward basal tubing structure in juxtaposed adjacency to a rightward wide-band, pre-bondable sleeve.
Figure 30:
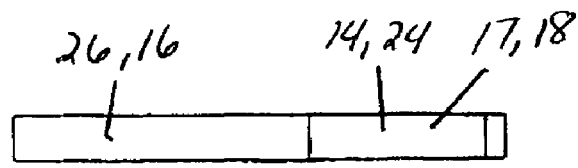
FIG. 30 is a fragmentary side view depiction of the basal tubing structure shown in FIG. 29 as pre-bonded with the wide-band, pre-bondable sleeve thus forming a single, wide-banded, secondary pre-bonded tubing assembly.
Figure 31:
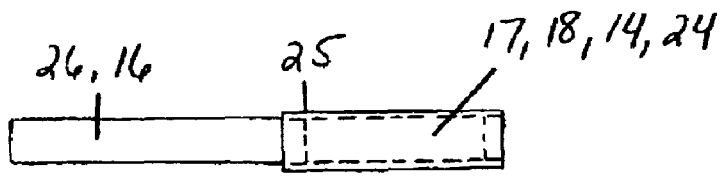
FIG. 31 is a fragmentary side view depiction of the single, wide-banded, secondary pre-bonded tubing assembly shown in FIG. 30 as outfitted with a shrink sleeve in enveloped relation about the wide-band, pre-bondable sleeve.
Figure 32:
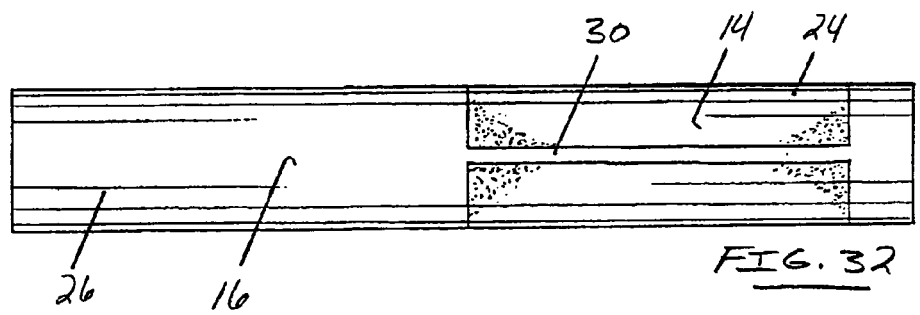
FIG. 32 is a fragmentary enlarged side view depiction of a basal tubing structure outfitted with a first alternative pre-bondable sleeve having a longitudinal slit.
Figure 33:
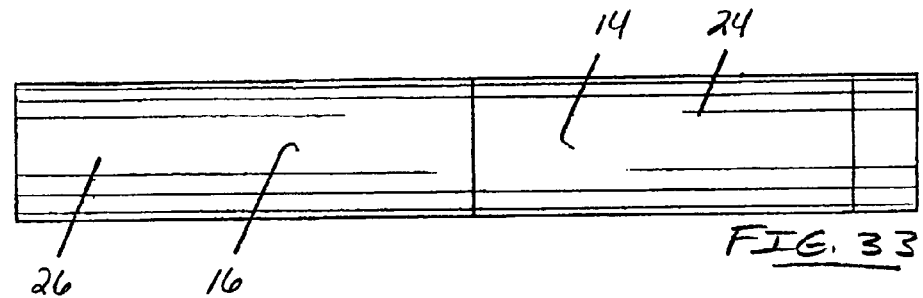
FIG. 33 is a fragmentary enlarged side view depiction of the outfitted basal tubing structure shown in FIG. 32 following thermal energy application, the pre-bondable sleeve being softened into a flowable state thereby eliminating the longitudinal slit.
Figure 34:
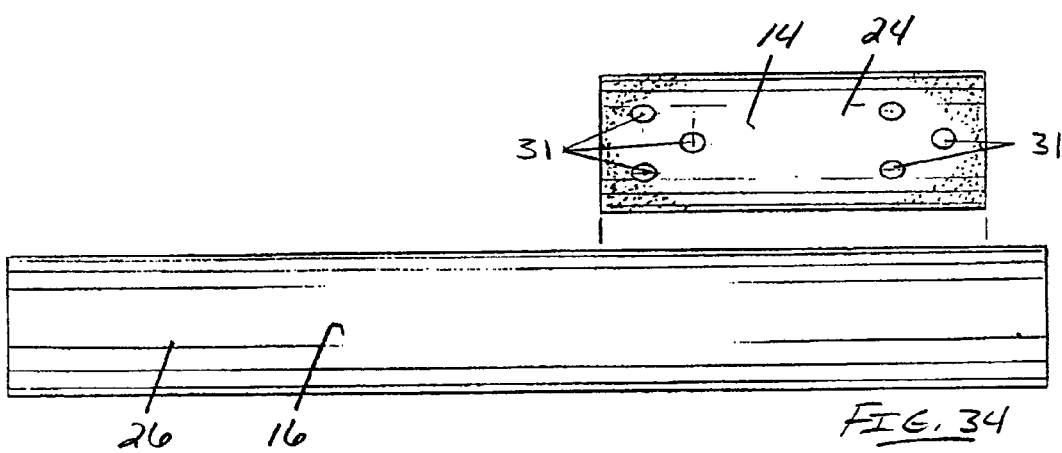
FIG. 34 is a fragmentary enlarged side view depiction of a basal tubing structure in juxtaposed adjacency to a second alternative pre-bondable sleeve having a plurality of apertures.
Figure 35:
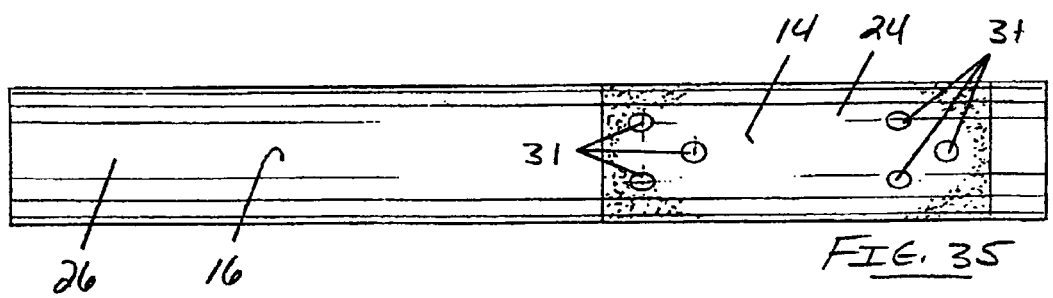
FIG. 35 is a fragmentary enlarged side view depiction of the basal tubing structure shown in FIG. 34 outfitted with the second alternative pre-bondable sleeve.
Figure 36:
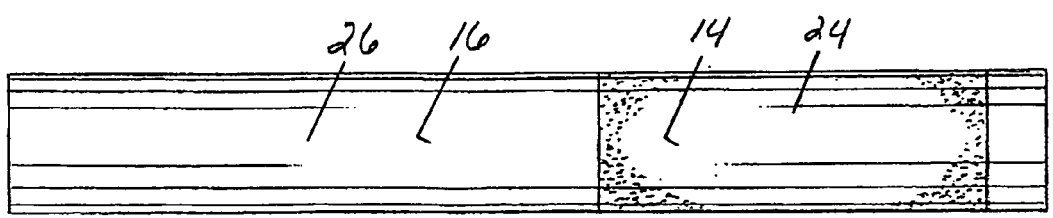
FIG. 36 is a fragmentary enlarged side view depiction of the outfitted basal tubing structure shown in FIG. 35 following thermal energy application, the pre-bondable sleeve being softened into a flowable state thereby eliminating the apertures.
Figure 40:
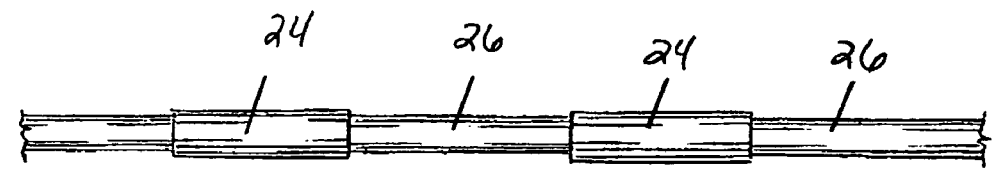
FIG. 40 is a fragmentary photographic side view of a United States of America ten cent coin (dime) intermediate an upward double-banded secondary pre-bonded tubing assembly and a single, wide-banded, secondary pre-bonded tubing assembly for purposes of demonstrating dimension characteristics.
Figure 40:
Figure 40:
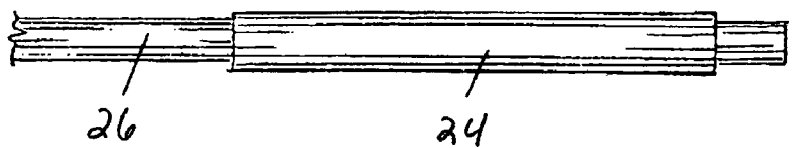
Figure 41:
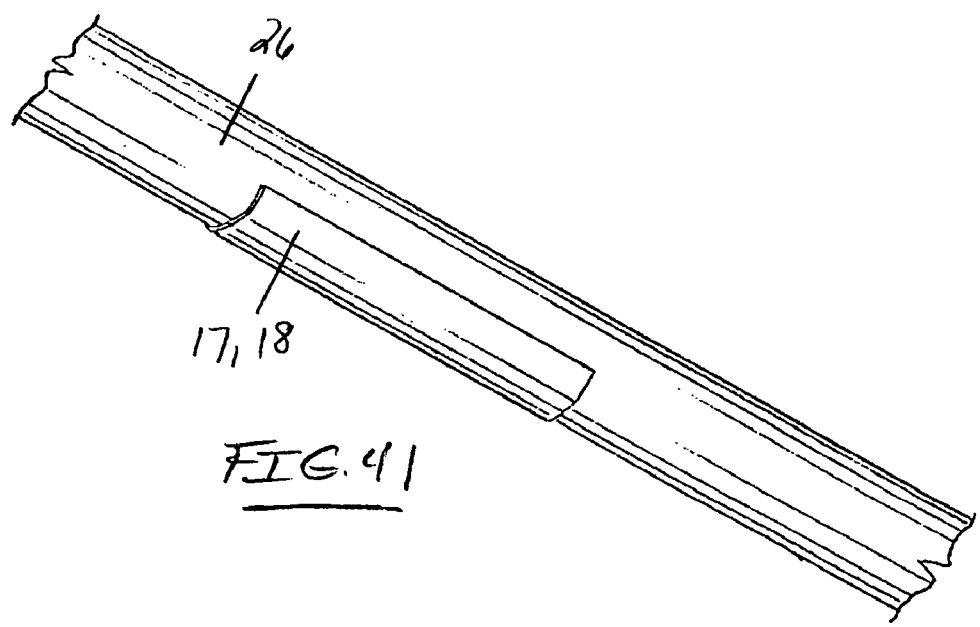
FIG. 41 is a fragmentary perspective view showing a patch-type pre-bond sleeve bonded to a basal tubing structure.
Figure 42A:
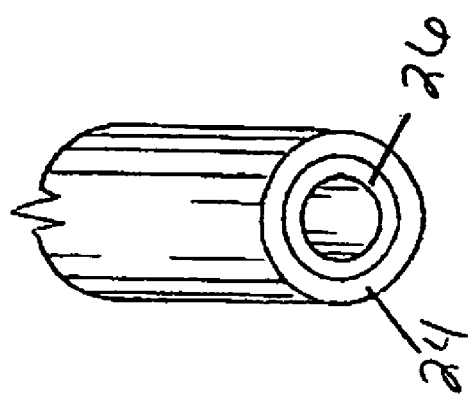
FIG. 42(*a*) is a fragmentary top perspective end view of pre-bondable sleeve bonded to a basal tubing structure.
Figure 42B:
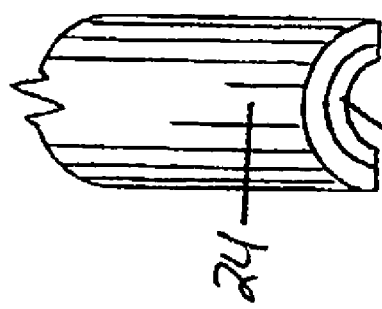
Figure 42C:
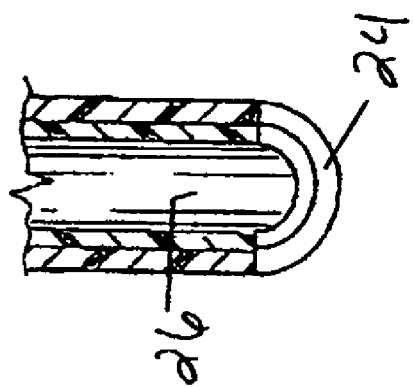

The size and number of intermediary layers is not so narrowly limited, but may be varied as per the requirements of the manufacturer. For example, multiple intermediary layers such as layers 17 and/or 18 may be formed upon pre-bond-receiving surface 16 as generally depicted in FIGS. 27 and 28. In this last regard, it may be seen that axially or longitudinally spaced areas or regions 29 may be mapped for eventual application of certain select or chosen thermoplastic materials that comprise layers 17 and/or 18 as generally depicted in FIG. 21. In addition to multiple, spaced layers 17 and/or 18, it is further contemplated that narrow versus wide type intermediary layers 17 and/or 18 may be formed upon pre-bond-receiving surface 16 as generally and comparatively depicted in FIGS. 27 and 28 versus FIGS. 30 and 32, and as depicted together in a single illustration in FIG. 40.

Figure 7:
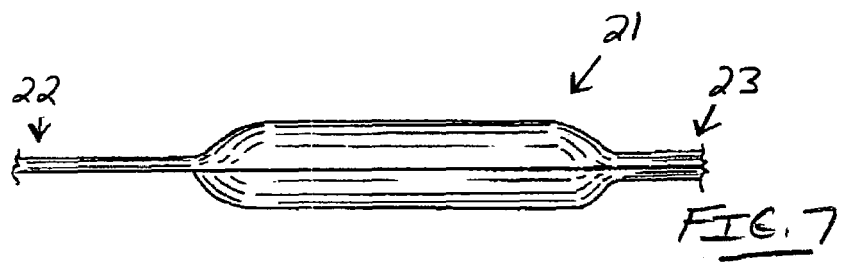
FIG. 7 is a fragmentary side view depiction of a prior art medical balloon structure having a first length.
Figure 8:
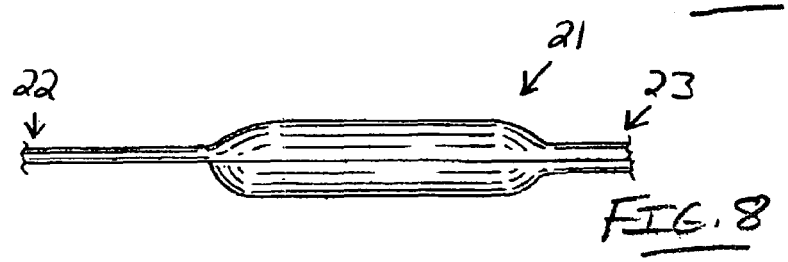
FIG. 8 is a fragmentary side view depiction of a prior art medical balloon structure having a second length, the second length being relatively shorter in magnitude than the first length depicted in FIG. 7.
Figure 9:
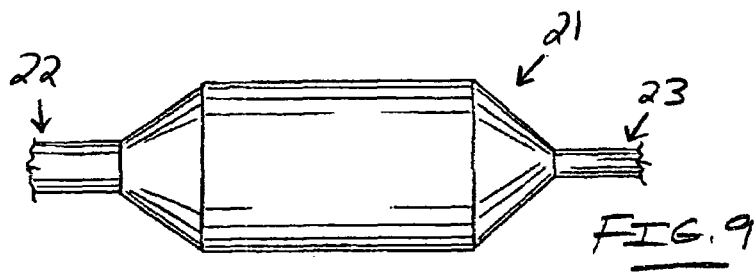
FIG. 9 is a fragmentary side view depiction of a prior art medical balloon structure having a first girth.
Figure 10:
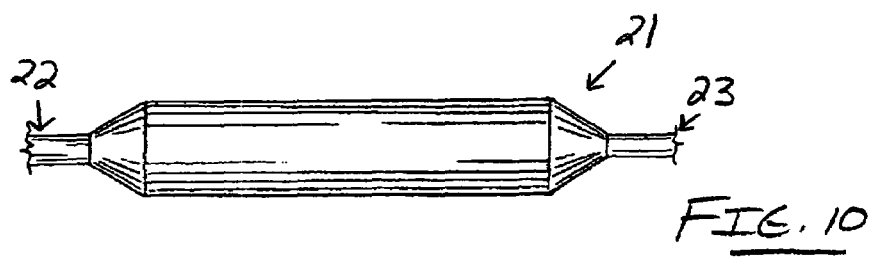
FIG. 10 is a fragmentary side view depiction of a prior art medical balloon structure having a second girth, the second girth being relatively smaller in magnitude than the first girth depicted in FIG. 9.
Figure 15:
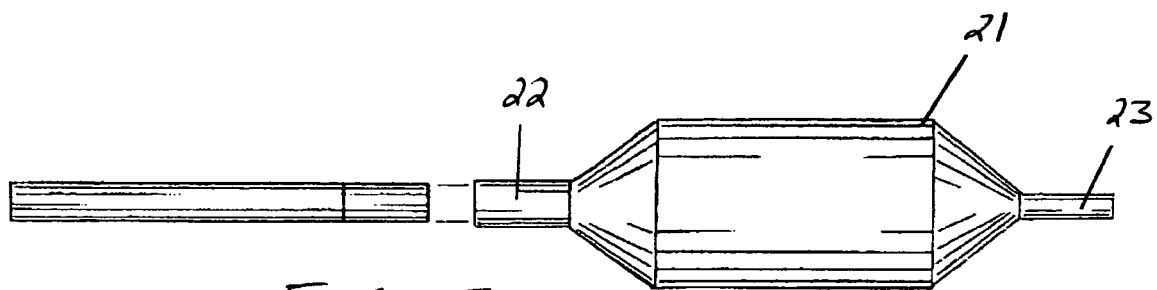
FIG. 15 is a fragmentary side view depiction of a secondary pre-bonded tubing assembly depicted in FIG. 13 juxtaposed adjacent a prior art medical balloon structure having (1) the first girth depicted in FIG. 9, (2) a proximal end, and (3) a distal end.
Figure 16:
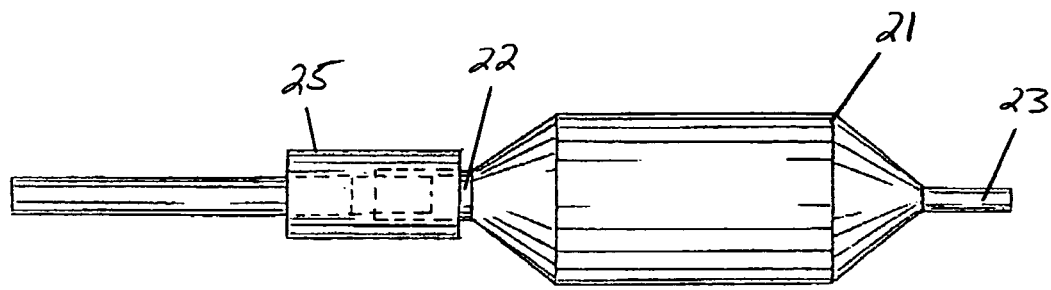
FIG. 16 is a fragmentary side view depiction of the secondary pre-bonded tubing assembly in bonding position with the proximal end of the prior art medical balloon structure shown in FIG. 15, the pre-bondable sleeve being positioned in radially inward adjacency to the proximal end at a tubing-balloon junction, and an unrecovered second shrink sleeve member being positioned in enveloping relation about the tubing-balloon junction thus forming a preferred, finally-bondable tubing-balloon assembly.

Prior art medical balloon type structures are well known in the field. A number of medical balloon structures 21 have been illustrated and/or depicted in the present application as referenced in FIGS. 5-10, 15-18, 22-25, 37, and 38. Medical balloon structures 21 typically comprise a proximal balloon end 22 as illustrated and referenced in the noted figures and a distal balloon end 23 as illustrated and referenced in FIGS. 6-10, 15-18, 22-25, 37, and 38. Intermediate the proximal ends 22 and the distal ends 23 the medical balloon structures 21 may comprise any number of lengths as comparatively depicted in FIG. 7 versus FIG. 8, or any number of girths as comparatively depicted in FIG. 9 versus FIG. 10.

Given that catheters and medical balloon structures are typically constructed in tubular or cylindrical form, the present invention contemplates thermal bonding of basal tubular structures to pre-bondable sleeve-like structures 24 having circular transverse cross-sections as generally illustrated and referenced in FIGS. 11-13, 15, 16, 18, and 25-36. Pre-bondable sleeve-like structures 24 may be formed from a select type of material as per the needs of the end-user (for example, the materials of first intermediary layer 17 or the materials of second intermediary layer 18). Pre-bondable sleeve-like structures 24 preferably comprise the material or materials of any given melting point characteristic as desired by the end-user. Excellent results have been achieved utilizing PEBAX brand resins as sleeve-like structures 24 and/or intermediary layers 17 and/or 18, which product line is manufactured and sold by Arkema, Inc. with headquarters in Puteaux France.

Sleeve-like structures 24 are preferably sized and shaped to envelope a portion of second component 11 in outward radial adjacency to pre-bond-receiving surface 16 as generally depicted in FIG. 12. Pre-bond-receiving surface 16 (as outfitted with a sleeve-like structure 24) may thus be inserted in inward radial adjacency to (or telescopically received at) first bond surface 15 of first component 10 such that thermal energy 13 may be directed against the tubular telescoped assemblage with inward radial direction against energy-receiving surface 14 for bonding first component 10 to second component 11 at the component junction 12. FIGS. 14(b) and 14(c) depict an end of component 11 or a basal tubing structure 16 with a pre-bond-receiving outer surface 16 being insertable into component 10 or sleeve-like structure 24 having an inner first bond surface 15 and an outer energy-receiving surface 14.

Figure 17:
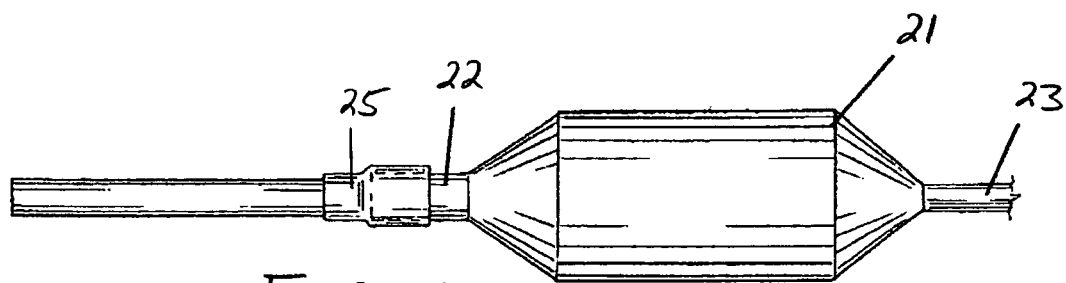
FIG. 17 is a fragmentary side view depiction of a recovered second shrink sleeve member as positioned in enveloping relation about the tubing-balloon junction for forming the preferred, finally-bondable tubing-balloon assembly.
Figure 18:
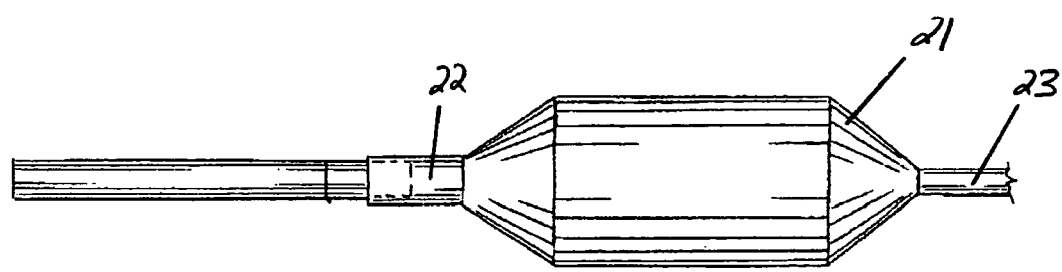
FIG. 18 is a fragmentary side view depiction of a finally-bonded tubing-balloon assembly with the recovered second shrink sleeve member otherwise depicted in FIG. 17 removed.

As a means to enhance the thermal bond strength of component junction 12, it is contemplated that the bonding technician may employ a heat shrinkable sleeve 25 as illustrated and referenced in FIGS. 13, 16, 17, 27, and 31. It will be understood from a consideration of the noted figures that heat shrinkable sleeves 25 may function as a conduit for thermal energy and as shrunk thereby provide substantially uniform pressure to provide a smooth strong bond with a smooth transition to the shaft or basal tubular structure 26 as generally depicted in FIG. 17. It is contemplated that sleeve-like structures 24 may comprise certain voids such as a certain longitudinal slit 30 as illustrated and referenced in FIG. 32 or certain transverse apertures 31 as illustrated and referenced in FIGS. 34 and 35. The select type of sleeve-like structure 24 may be chosen prior to application of thermal energy 13 so that upon thermal energy application, the material(s) comprising the sleeve-like structures 24 will flow into the voids and reduce the overall material or medium thickness. It is contemplated that the voids may well function to ease installation of sleeve-like structures.

Figure 22:
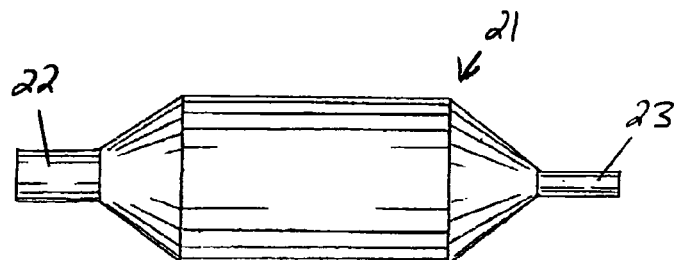
FIG. 22 is a generic side view depiction of a prior art medical balloon structure having a leftward proximal end and a rightward distal end.
Figure 23:
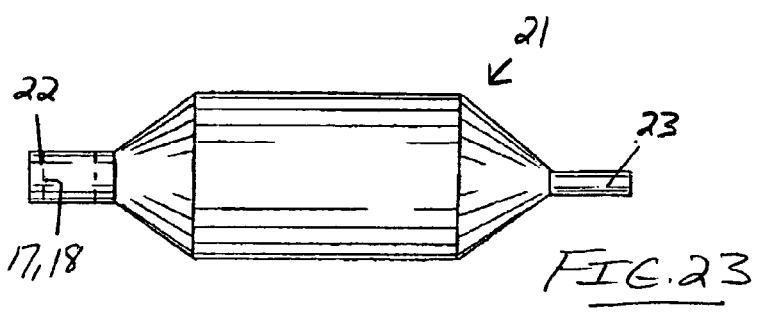
FIG. 23 is a generic side view depiction of the prior art medical balloon structure shown in FIG. 22, the proximal end of which is outfitted with an alternative inner neck "pre-bond" material thus forming a secondary pre-bonded balloon assembly.
Figure 24:
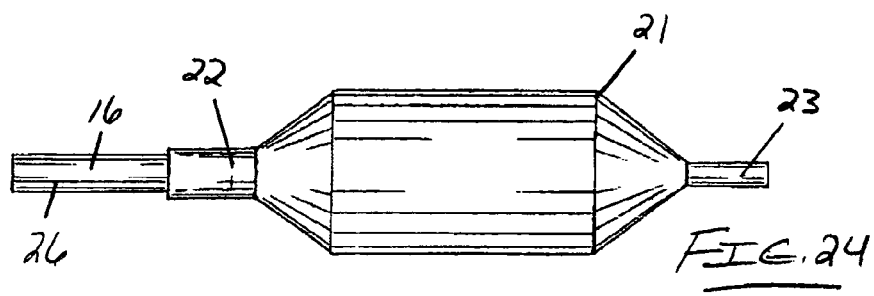
FIG. 24 is a fragmentary side view depiction of a basal tubing structure being received and bondable to the alternative inner neck "pre-bond" material shown in FIG. 23.
Figure 25:
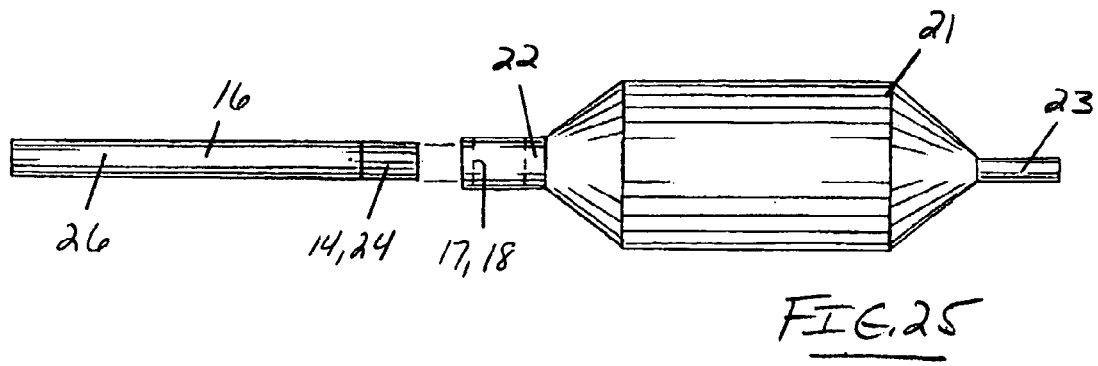
FIG. 25 is a fragmentary side view depiction of a secondary pre-bonded tubing assembly and a secondary pre-bonded balloon assembly juxtaposed adjacent one another for forming an alternative, finally-bondable tubing-balloon assembly.
Figure 26:
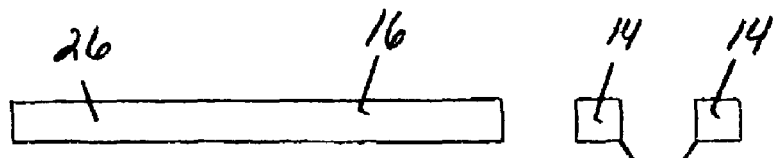
FIG. 26 is a fragmentary side view depiction of a leftward basal tubing structure in juxtaposed adjacency to rightward first and second pre-bondable sleeves.

Catheters or basal tubular structures 26 (as illustrated and referenced in FIGS. 11-13 14(a), 14(c)-21, and 24-41 may be preferably constructed from PELLETHANE brand elastomer (by the Dow Chemical Company), $P_{EBAX}$ brand elastomer, polyurethane, or similar other materials. Basal tubular or tubing structures 26 may comprise multiple lumens 27 as generally illustrated and referenced in FIG. 19, and may comprise certain notches 28 (such as an inflation notch) as illustrated, taught, and otherwise referenced in FIGS. 20 and 21. Notably, it is contemplated that either the exterior surface of a basal tubular member 26 may be defined by pre-bond-receiving surface 16 or the inner neck surface (of proximal end 22) of medical balloon structure 21 may be defined by pre-bond-receiving surface 16. Conversely, intermediary layers 17 and/or 18 may thus be bonded to the pre-bond-receiving surface 16. Intermediary layers 17 and/or 18 are depicted in FIGS. 22 and 25 as bonded to the inner neck surface (as heretofore noted). FIG. 25 depicts a structural scenario wherein both the exterior surface of basal tubular member 26 and the inner neck surface are defined by pre-bond-receiving surface 16. The intermediary layers 17 and/or 18 may thus bond to one another at a component junction.

A further methodology contemplates the use of non-meltable or relatively high melting point intermediary component layers, such as polyethylene terephthalate (PET). In this regard, it is contemplated that intermediary layers 17 and/or 18 may comprise sticky or tacky thermoplastic material 32 (as referenced in FIGS. 37 and 38) such as ethylene vinyl acetate (EVA) or polyurethane (PUR). A so-called pre-bond of the tacky intermediary layer 17 and/or 18 may be effectively used, and the PET may be effectively bonded to that intermediary structure under thermal energy application. Further, a captivating gasket structure 33 may be utilized that sandwiches energy-receiving surface 14 and an inner portion 34 of captivating gasket structure 33 against pre-bond-receiving surface 16 as generally depicted in FIG. 38.

It will thus be understood that the present methodology teaches certain pre-bonding techniques, which is the most fundamental aspect of this method. The disclosed methodology enables bonding of materials of different thermal properties, including differing melt points. Further, the disclosed methodology enables bonding of materials that are not normally thermally bondable due to material incompatibility. Notably, air may be excluded during thermal energy application thus allowing heating of the "pre-bond" material to heat levels beyond normally allowable levels, allowing it to bond with higher temperature substrates as the higher temperature component is brought to its softening point.

The bonding methods contemplated by the present methodology are contemplated to include certain thermal polymer-bonding methods, certain thermal bonding methods, and certain polymer-bonding methods. It is further contemplated that the thermal polymer-bonding method of the present disclosure may well function to finally bonding a polymer-based component assembly, such as a catheter balloon assembly 50 or similar article of manufacture. The thermal polymer-bonding method is thought to essentially comprise the steps of placing into contact or contacting certain polymer-based first and second solid media (such as components 10 and 11) at a first junction (such as junction 12) under a substantially uniform first pressure. This has essentially been depicted in FIG. 1. Notably, as set forth hereinabove, the first and second media preferably comprise differing thermal properties including differing melting points. Thus, in the preferred methodology, the first solid medium has a certain first melting point and the second solid medium has a certain second melting point (under the uniform first pressure). Key to the practice of the invention, however, is that the first melting point be preferably lesser in magnitude than the second melting point. Stated another way, given a certain infusion of heat or thermal excitation, the material of the first medium will melt at a lower temperature and before the material of the second medium.

By thermally energizing the first junction as at reference numeral 13, one thereby may effectively liquefy a superficial portion of the first solid medium. In this regard, it will be recalled that a portion of first bond surface 15 liquefies via the application of thermal energy 13, which portion is then superficially applied to the second solid medium via the contacting first and second solid media. When the first solid medium is separated from the liquefied superficial portion, the action functions to deposit a first liquid component in superficial adjacency to the first junction, it being noted that the first junction is essentially the interface intermediate the first and second media or the interface intermediate components 10 and 11. The interface then is deep to the top surface of the remaining liquefied superficial portion.

When cooled or thermally de-energized, the first liquid component at the first junction thereby solidifies into a first component residue or first intermediary layer 17. It should be understood that the first component residue or first intermediary layer 17 preferably comprises a substantially uniform residue or layer thickness. Together, the second solid medium and the first component residue or intermediary layer 17 form intermediary component assembly 19 as depicted in FIG. 2. Intermediary component assembly 19 may then be stored for later application.

When further component construction is desired, intermediary component assembly 19 may be properly situated and a polymer-based third solid medium may be contacted with the first component residue at a second junction in superficial adjacency to the otherwise deep first junction or interface. In other words, the second junction is preferably separated from the first junction by the residue or medium thickness of the first solid medium Notably, it is contemplated that the third solid medium has certain thermal properties, including a third melting point, the third melting point being lesser in magnitude than the second melting point. In this regard, it should be noted that the first solid medium also comprises a melting point lesser in magnitude than the second melting point, and thus the third solid medium may be defined by the first solid medium.

It is contemplated in this last regard, that finally bonded components may involve a single substrate (the second medium) with a pre-bond (formed via the first medium) to form intermediary component assembly 19, which assembly 19 may then be used to further and quickly bond an additional (or third) component to the pre-bond, which pre-bond and third component comprise the same materials. By pre-bonding with the same material, one thereby eliminates the need to consider added thermal energy considerations otherwise required for bonding three types of materials to one another in the manner set forth herein.

After making contact intermediate the first and third media, the second junction may be thermally energizing (i.e. heat may be applied to the second junction) to liquefy second superficial portions of the third solid medium and/or the first component residue. It is contemplated that the liquefied superficial portions may effectively function to enhance material diffusion or enable relatively rapid material diffusion intermediate the third solid medium and the first component residue in a material diffusion zone. Notably, if the first and third media may comprise either the same or differing melting points, only one of the materials may liquefy; and thereby aid in the bonding process.

Figure 37:
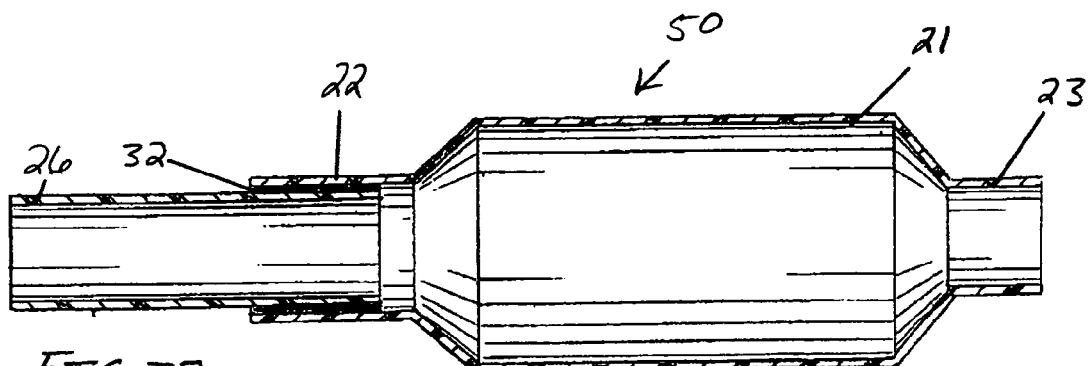
FIG. 37 is a fragmentary enlarged side view depiction of a first alternative finally-bonded component assembly having certain parts broken away to more clearly depict a basal tubing structure as outfitted with a pre-bond sleeve formed of a tacky thermoplastic material for bonding non-meltable adjacent component layers.
Figure 38:
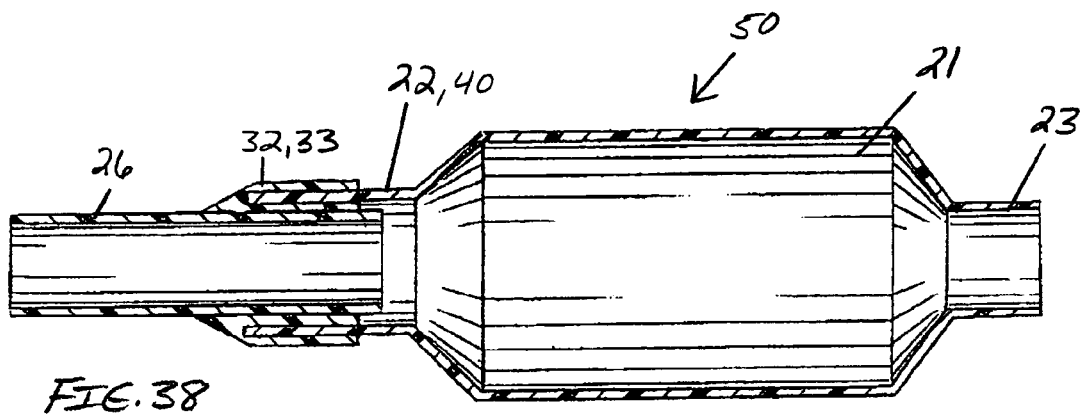
FIG. 38 is a fragmentary enlarged side view depiction of a second alternative finally-bonded component assembly having certain parts broken away to more clearly depict depicting a basal tubing structure as outfitted with a pre-bond gasket for bonding non-meltable adjacent component layers.
Figure 39:
FIG. 39 is a fragmentary photographic side view of a pre-bondable sleeve bonded to a basal tubing structure adjacent a United States of America ten cent coin (dime) for purposes of demonstrating dimension characteristics.
Figure 39:
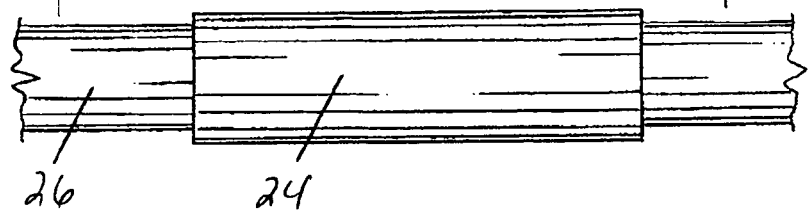

It is contemplated that the second solid medium may be defined by a basal tubing structure such as component 11 or 26, the first solid medium may be defined by a thermal interface sleeve 24, and the third solid medium may be defined by a catheter balloon 21, the finally bonded component assembly being a catheter balloon assembly as generally illustrated and referenced in FIGS. 37 and 38 at reference numeral 50. As previously specified, the basal tubing structure 26 may comprise a plurality of lumens 27. As further specified, the first solid medium as definable by sleeve-like structure 24 may be provided in a plurality of first media portions for attachment to regions such as regions 29 in FIG. 21. Should the lumens 27 comprise an inflation lumen notch 28, the inflation lumen notch 28 may be preferably disposed intermediate opposing first media portions before initially contacting the first and second solid media.

It is contemplated that in a first preferred methodology, both materials may liquefy to allow better bonding adhesion as may be achieved by thermally de-energizing the material diffusion zone thereby solidifying the liquefied superficial portions and thermally bonding the third solid medium to the first component residue to form a finally-bonded component assembly. In a second preferred methodology, the one material may be liquefied to increase or enhance surface area contact between the opposing contacting materials. Upon solidification, the increased or enhanced surface area contact operates to enhance bonding adhesion between the first and third solid media to form a finally-bonded component assembly.

As set forth hereinabove, an alternative methodology here contemplated involves use of a third material for creating a second intermediary layer 18 as generally illustrated and referenced in FIG. 4. In this regard, a third component or medium may be pre-bonded to a first component or medium, which intermediary assembly is then bonded to a second component or medium. Thus, the thermal polymer-bonding method may involve initially bonding the first solid medium to the second solid medium as before, but thermally de-energizing the first junction without removing the first solid medium therefrom. The liquefied superficial portion(s) maximize the surface area contact between opposing first and second media, and the liquefied portions are cooled for thermally bonding the two media to one another to form the intermediary component assembly.

The first solid medium may then be placed into contact with a third solid medium at a second junction, which second junction is separated from the first junction by the first medium thickness. The second junction is thermally energized to liquefy second superficial portions of the first and third solid media, the liquefied second superficial portions enabling relatively rapid material diffusion intermediate the first and third solid media in a material diffusion zone in cases where both the first and third media exhibit some degree of liquidity. If only one of the materials liquefies, the liquefied portions function to maximize surface area contact intermediate opposing materials. In any event, the liquefied portion(s) may then be thermally de-energized for solidifying the liquefied second superficial portions and thermally bonding the third solid medium to the first solid medium to form a finally-bonded polymer-based component assembly.

As generally depicted in FIGS. 38, it is contemplated that the first solid medium as referenced at 32 may contact the third solid medium as referenced at 40 via second and third cylindrical junctions. In other words, the first solid medium may sandwich the third solid medium between opposing first media layers or cylindrical junctions. The first solid medium may be preferably defined or described as captivating gasket structure 33. The second and third cylindrical junctions may be essentially simultaneously energized during the step of thermally energizing the second cylindrical junction. It is contemplated that the second and third cylindrical junctions may well function to maximize or increase the surface area contact intermediate the first and third solid media for enhancing bonding adhesion intermediate the first and third media.

Notably, the first solid medium may comprise certain select voids extending intermediate the first medium thickness. It is contemplated that the select voids may be filled with the liquefied superficial portion during the step of thermally energizing the first cylindrical junction (thereby reducing the first medium thickness). It is further contemplated that the select voids may be selected from the group consisting of a longitudinal slit 30 as illustrated and referenced in FIG. 32 and/or a plurality of transverse apertures 41 as illustrated and referenced in FIGS. 34 and 35. In any event, the select voids may be selected before initially contacting the first and second solid media as per the election of the manufacturer.

The sandwiched portion of the third solid medium may comprise a third medium thickness and select voids or perforations (much akin to apertures 41 as referenced in FIGS. 34 and 35) to provide mechanical interlocking of materials or enhanced bonding adhesion intermediate the first and third solid media. It is contemplated that the select voids may extend intermediate or into the third medium thickness and may be filled (wholly or partially) with the liquefied second superficial portions during the step of thermally energizing the second cylindrical junction.

The step of thermally energizing the second cylindrical junction may include the step of applying substantially uniform radially directed pressure against the second cylindrical junction. It is contemplated that the application of radially directed pressure may well function to enhance uniform bonding adhesion intermediate the first and third solid media. The application of substantially uniform radially directed pressure may be achieved by first enveloping the second and third media with a forth solid medium after contacting the first and third solid media. The fourth solid medium preferably has a relatively high fourth melting point, the fourth melting point being greater in magnitude or a magnitude far in excess of the first melting point. In this regard, it is contemplated that may comprise certain thermoplastic material and may be preferably defined by a length of heat shrink tubing a heat shrinkable sleeve 25 as illustrated and referenced in FIGS. 13, 16, 27, and 30. It is contemplated that the thermoplastic material may well function to effect radially directed pressure while thermally energizing the second cylindrical junction insofar as the diameter of the tubing narrows during the thermal energizing process. After de-energizing the second superficial portions of the first and/or third media, the fourth solid medium may be separated from second and third media.

While the foregoing specifications delineate much specificity, the same should not be construed as limiting the invention, but as providing a backdrop from which the essence of the present invention emerges. Thus, it is contemplated that the present invention discloses various inventive aspects stemming from the same core concepts, including certain methods for thermally bonding various polymer-based component. The methods essentially comprise an initial step of contacting first and second solid media at a first junction, which first and second solid media having differing thermal properties. Thereafter, heat or thermal energy may be input into the first junction to liquefy a first superficial portion of the first solid medium, which first superficial portion is then superficially applied to the second solid medium. The applied superficial portion may then be cooled or thermally de-energizing thereby bonding the first solid medium to the second solid medium. The bonded first and second solid media together form an intermediary component assembly.

The first solid medium of the intermediary component assembly may then be placed into contact with a third solid medium at a second junction, which third solid medium comprises distinct thermal properties as compared to the second solid medium, and which second junction is separated from the first junction by the medium thickness of the first solid medium. The second junction may then be thermally energized to liquefy second superficial portions of the first and third solid media, the liquefied second superficial portions enhancing material diffusion intermediate the first and third solid media and/or increasing surface area contact therebetween. Thereafter, the second junction may be thermally de-energizing or cooled to thereby solidify the otherwise liquefied second superficial portions and thermally bond the third solid medium to the first solid medium to form a finally-bonded component assembly.

Stated another way, the methodology disclosed by the foregoing may be said to teach a certain polymer bonding method comprising certain steps, including placing into contact certain polymer-based first and second solid media at a first junction, liquefying a first superficial portion of the first solid medium at the first junction; superficially applying the first superficial portion to the second solid medium; solidifying the first superficial portion at the first junction thereby bonding the first solid medium to the second solid medium; contacting the first solid medium with a polymer-based third solid medium at a second junction; liquefying second superficial portions of the first and third solid media; and solidifying the liquefied second superficial portions thereby bonding the third solid medium to the first solid medium to form a finally-bonded component assembly.

Certain advantages of the foregoing processes include (1) finally forming constructions wherein one of more surfaces can be pre-bonded with one or more materials; (2) pre-bonding steps may be achieved through identical material as one of the components being joined or a different hardness level, a different version of the same material, a modified material or a completely different material; (3) faster, more thorough bonds with less thermal energy requirements and less material degradation; (4) utility with some semi-crystalline materials, such as PET balloons, and also with thermoset materials. Although the invention has been described by reference to a number of preferred methodologies, and the advantages thereof set forth, it is not intended that the novel processes be limited thereby, but that modifications thereof are intended to be included as falling within the broad scope and spirit of the foregoing disclosure and the appended drawings.

We claim:

1. A thermal polymer-bonding method, the thermal polymer-bonding method for finally bonding a polymer-based component assembly, the thermal polymer-bonding method comprising the steps of:

contacting polymer-based first and second solid media at a first junction, the first solid medium having a first melting point and the second solid medium having a second melting point, the first melting point being lesser in magnitude than the second melting point;

thermally energizing the first junction to liquefy a first superficial portion of the first solid medium, the first superficial portion being superficially applied to the second solid medium via the contacting first and second solid media;

separating the first solid medium from the first superficial portion thereby depositing a first liquid component in superficial adjacency to the first junction;

thermally de-energizing the first liquid component at the first junction thereby solidifying the first superficial portion into a first component residue, the first component residue having a substantially uniform residue thickness, the second solid medium and the first component residue forming an intermediary component assembly;

contacting the first component residue with a polymer-based third solid medium at a second junction, the third solid medium having a third melting point, the third melting point being lesser in magnitude than the second melting point, the second junction being separated from the first junction by the residue thickness;

thermally energizing the second junction to liquefy at least one second superficial portion of the third solid medium and the first component residue, each liquefied second superficial portion increasing surface area contact intermediate the third solid medium and the first component residue; and thermally de-energizing each second superficial portion thereby solidifying said portion and thermally bonding the third solid medium to the first component residue to form a finally-bonded component assembly.

2. The thermal polymer-bonding method of claim 1 wherein the third solid medium is the same material as the first solid medium.

3. The thermal polymer-bonding method of claim 1 wherein the first solid medium simultaneously contacts the third solid medium via a third junction while contacting the third solid medium at the second junction, the third solid medium being sandwiched intermediate the second and third junctions, the second and third junctions for increasing surface area contact intermediate the first and third solid media, the increased surface area contact for enhancing bonding adhesion intermediate the first and third media, the second and third junctions being simultaneously energized during the step of thermally energizing the second junction.

4. The thermal polymer-bonding method of claim 3 wherein the third solid medium comprises a third medium thickness and select voids, the select voids extending into the third medium thickness, the select voids being filled with the liquefied second superficial portions during the step of thermally energizing the second junction, the select voids for enhancing bonding adhesion intermediate the first and third solid media.

5. The thermal polymer-bonding method of claim 1 wherein the first solid medium comprises select voids, the select voids extending intermediate the first medium thickness, the select voids being filled with the liquefied superficial portion during the step of thermally energizing the first junction.

6. The thermal polymer-bonding method of claim 5 wherein the select voids are selected from the group consisting of a longitudinal slit and a plurality of transverse apertures, the select voids being selected before initially contacting the first and second solid media.

7. The thermal polymer-bonding method of claim 1 wherein the step of thermally energizing the second junction includes the step of applying substantially uniform radially directed pressure against the second junction, the applied radially directed pressure for enhancing uniform bonding adhesion intermediate the first and third solid media.

8. The thermal polymer-bonding method of claim 7 comprising the step of enveloping the second and third media with a forth solid medium after contacting the first and third solid media, the fourth solid medium having a fourth melting point, the fourth melting point being greater in magnitude than the first melting point.

9. The thermal polymer-bonding method of claim 8 wherein the fourth solid medium is separated from second and third media after thermally de-energizing the second superficial portions.

10. The thermal polymer-bonding method of claim 8 wherein the fourth solid medium comprises thermoplastic material, the thermoplastic material for effecting radially directed pressure while thermally energizing the second junction.

11. The thermal polymer-banding method of claim 10 wherein the fourth solid medium is defined by a length of heat shrink tubing.

12. The thermal polymer-bonding method of claim 1 wherein the second medium defines a basal tubing structure, the first medium defines a thermal interface sleeve, and the third medium defines a catheter balloon, the finally bonded component assembly being a catheter balloon assembly.

13. The thermal polymer-bonding method of claim 12 wherein the basal tubing structure comprises a plurality of lumens and the first solid medium comprises a plurality of first media portions, the plurality of lumens comprising an inflation lumen notch, the inflation lumen notch being disposed intermediate opposing first media portions before initially contacting the first and second solid media.

14. A thermal polymer-bonding method, the thermal polymer-bonding method for finally bonding a polymer-based component assembly, the thermal polymer-bonding method comprising the steps of:

contacting polymer-based first and second solid media at a first cylindrical junction, the first solid medium having a first melting point and the second solid medium having a second melting point, the first melting point being lesser in magnitude than the second melting point;

thermally energizing the first cylindrical junction to liquefy a first superficial portion of the first solid medium, the first superficial portion being superficially applied to the second solid medium via the contacting first and second solid media;

separating the first solid medium from the first superficial portion thereby depositing a first liquid component in superficial adjacency to the first cylindrical junction;

thermally de-energizing the first liquid component at the first cylindrical junction thereby solidifying the first superficial portion into a first component residue, the first component residue having a substantially uniform residue thickness, the second solid medium and the first component residue forming an intermediary component assembly, contacting the first component residue with a polymer-based third solid medium at a second cylindrical junction, the third solid medium having a third melting point, the third melting point being lesser in magnitude than the second melting point, the second junction being separated from the first junction by the residue thickness;

thermally energizing the second cylindrical junction to liquefy at least one second superficial portion of the third solid medium and the first component residue, each liquefied second superficial portion increasing surface area contact intermediate the third solid medium and the first component residue; and thermally de-energizing each second superficial portion thereby solidifying said portion and thermally bonding the third solid medium to the first component residue to form a finally-bonded component assembly.

15. The thermal polymer-bonding method of claim 14 wherein the third solid medium is the same material as the first solid medium.

16. The thermal polymer-bonding method of claim 14 wherein the first solid medium simultaneously contacts the third solid medium via a third cylindrical junction while contacting the third solid medium at the second cylindrical junction, the third solid medium being sandwiched intermediate the second and third cylindrical junctions, the second and third cylindrical junctions for increasing surface area contact intermediate the first and third solid media, the increased surface area contact for enhancing bonding adhesion intermediate the first and third media, the second and third cylindrical junctions being simultaneously energized during the step of thermally energizing the second cylindrical junction.

17. The thermal polymer-bonding method of claim 16 wherein the third solid medium comprises a third medium thickness and select voids, the select voids extending into the third medium thickness, the select voids being filled with the liquefied second superficial portions during the step of thermally energizing the second cylindrical junction, the select voids for enhancing bonding adhesion intermediate the first and third solid media.

18. The thermal polymer-bonding method of claim 14 wherein the first solid medium comprises select voids, the select voids extending intermediate the first medium thickness, the select voids being filled with the liquefied superficial portion during the step of thermally energizing the first cylindrical junction.

19. The thermal polymer-bonding method of claim 18 wherein the select voids are selected from the group consisting of a longitudinal slit and a plurality of transverse apertures, the select voids being selected before initially contacting the first and second solid media.

20. The thermal polymer-bonding method of claim 14 wherein the step of thermally energizing the second cylindrical junction includes the step of applying substantially uniform radially directed pressure against the second cylindrical junction, the applied radially directed pressure for enhancing uniform bonding adhesion intermediate the first and third solid media.

21. The thermal polymer-bonding method of claim 20 comprising the step of enveloping the second and third media with a forth solid medium after contacting the first and third solid media, the fourth solid medium having a fourth melting point, the fourth melting point being greater in magnitude than the first melting point.

22. The thermal polymer-bonding method of claim 21 wherein the fourth solid medium is separated from second and third media after thermally de-energizing the second superficial portions.

23. The thermal polymer-bonding method of claim 21 wherein the fourth solid medium comprises thermoplastic material, the thermoplastic material for effecting radially directed pressure while thermally energizing the second cylindrical junction.

24. The thermal polymer-bonding method of claim 23 wherein the fourth solid medium is defined by a length of heat shrink tubing.

25. The thermal polymer-bonding method of claim 14 wherein the second medium defines a basal tubing structure, the first medium defines a thermal interface sleeve, and the third medium defines a catheter balloon, the finally bonded component assembly being a catheter balloon assembly.

26. The thermal polymer-bonding method of claim 25 wherein the basal tubing structure comprises a plurality of lumens and the first solid medium comprises a plurality of first media portions, the plurality of lumens comprising an inflation lumen notch, the inflation lumen notch being disposed intermediate opposing first media portions before initially contacting the first and second solid media.

27. A thermal polymer-bonding method, the thermal polymer-bonding method for finally bonding a polymer-based component assembly, the thermal polymer-bonding method comprising the steps of:
  contacting polymer-based first and second solid media at a first junction, the first and second solid media having differing thermal properties, the first solid medium having a medium thickness;
  thermally energizing the first junction to liquefy a first superficial portion of the first solid medium, the first superficial portion being superficially applied to the second solid medium via the contacting first and second solid media;
  separating the first solid medium from the first superficial portion thereby depositing a first liquid component in superficial adjacency to the first junction;
  thermally de-energizing the first liquid component at the first junction thereby solidifying the first superficial portion into a first component residue, the second solid medium and the first component residue forming an intermediary component assembly;
  contacting the first component residue with a polymer-based third solid medium at a second junction, the second and third solid media having differing thermal properties;
  thermally energizing the second junction to liquefy a second superficial portion of the third solid medium and the first component residue, the liquefied second superficial portion increasing surface area contact intermediate the third solid medium and the first component residue; and
  thermally de-energizing the second superficial portion thereby solidifying said portion and thermally bonding the third solid medium to the first component residue to form a finally-bonded component assembly.

28. The thermal polymer-bonding method of claim 27 wherein the third solid medium is defined by the same material as the first solid medium.

29. A polymer bonding method, the polymer bonding method for finally bonding a polymer-based component assembly, the polymer-bonding method comprising the steps of:
  contacting polymer-based first and second solid media at a first junction, the first solid medium having a medium thickness;
  liquefying a first superficial portion of the first solid medium at the first junction, the first superficial portion being superficially applied to the second solid medium via the contacting first and second solid media;
  separating the first solid medium from the first superficial portion thereby depositing a first liquid component in superficial adjacency to the first junction;
  solidifying the first superficial portion into a first component residue, the second solid medium and the first component residue forming an intermediary component assembly;
  contacting the first component residue with a third solid medium at a second junction, the second junction being separated from the first junction by the medium thickness;
  liquefying a second superficial portion of the third solid medium and the first component residue, the liquefied second superficial portion increasing surface area contact intermediate the third solid medium and the first component residue; and
  solidifying the liquefied second superficial portion thereby bonding the third solid medium to the first component residue to form a finally-bonded component assembly.

30. The polymer bonding method of claim 29 wherein the third solid medium is the same material as the first solid medium.

* * * * *